3,420,791
PROCESS FOR MAKING GRANULAR POLYMERS
Arthur E. Gurgiolo, Lake Jackson, and William S. Holmes, Angleton, Tex., assignors to The Dow Chemical Company, Midland, Mich., a corporation of Delaware
No Drawing. Continuation of application Ser. No. 275,207, Apr. 24, 1963. This application Nov. 21, 1966, Ser. No. 596,006
U.S. Cl. 260—33.6                                  10 Claims
Int. Cl. C08g *53/02*

ABSTRACT OF THE DISCLOSURE

Solid organic polymers are formed in, or reduced to, granular form by agitation of the fused resin, or of the resin-forming reactants, in an organic non-solvent for the resin, said solvent having dispersed therein about 0.5 to 5% by weight of an ammonium cation-modified organophilic clay wherein the cation contains at least one alkyl radical of at least 10 carbon atoms.

---

Continuation of application Ser. No. 275,207, filed Apr. 24, 1963, and now abandoned.

This invention relates to processes for producing polymeric materials in granular form. More specifically, it relates to the production of granular polymers by the use of organophilic onium cation-modified clays as dispersing agents.

This process offers a means for preparing granular polymers in a controlled particle size but narrow particle size distribution and over a wide range of particle sizes ranging from 10 mesh to less than 325 mesh. It also permits the precipitation of low-melting polymers in granular form at temperatures above the melting point of the polymer without fusing the particles into a solid mass.

Also higher-melting polymers can be formed in granular form at temperatures required for the polymerization reaction, yet without loss of the ability of the system to form these polymers in the desired granular state.

Further, it has been found possible to utilize by means of this process an already formed thermoplastic polymer or plastic material and convert it into a granular product of any desired particle size.

The preparation of granular polymers is accomplished in this process by the use of organophilic clays which have been modified by absorption thereon of an onium cation, preferably ammonium, said cation having at least one alkyl substituent of at least 10 carbon atoms in a straight chain.

The preferred clays for use in this invention are such naturally occurring minerals as bentonites and montmorillonites containing inorganic cations which are rather easily replaced by substituted ammonium ions of the type described above. The modified clays are prepared by reacting a sodium, potassium, magnesium or similar type of bentonite-like clay with a substituted ammonium base salt, such as decylammonium chloride, whereby the decylammonium salt of the clay is formed. Alternatively, an acidic bentonite-like clay may be reacted with a substituted ammonium base such as decylamine to produce the organophilic ammonium cation-modified clay. These modified clays have a property of swelling several times their original volume in the presence of relatively polar organic solvents and are capable of thickening these relatively polar solvents.

In addition to these ammonium cation-modified clays, various onium cation modified clays suitable for use in the present invention are described in U.S. Patent No. 2,531,427 which was issued Nov. 28, 1950, to Ernst A. Hauser. Examples of such materials are montmorillonites, bentonites, zeolites, attapulgites, etc. Originally these clays were in the form of acidic or inorganic salts but have been converted into onium salts by reaction with an onium compound in which the onium radical is selected from the class consisting of ammonium, phosphonium, oxonium, sulfonium, seleneonium, stannonium, arsonium, stibonium, telluronium, and iodonium and has at least one alkyl substituent of at least 10 carbon atoms. The other onium cationic modified clays may be utilized in this invention in place of the ammonium cationic modified clays, although the latter are preferred.

The presence of an onium cation-modified clay such as those described in the preceding paragraphs has been found to act as a unique granulating agent for polymeric resins when the polymer is either prepared or dispersed in an organic medium.

Further, it has been found that as the concentration of the cationic clay is increased the particle size of the granular polymer decreases; that is, the polymer granular size is inversely proportional to the clay concentration.

For maximum efficiency of the modified clay in the preparation of the granular polymers it has been found desirable to thoroughly disperse the dry modified cationic clay in the organic medium in which the polymer is to be made, prior to the preparation and dispersing of the polymer. This can be done mechanically such as by grinding, milling, or stirring. It can also be done by the addition of chemical energy such as the adding of a properly chosen polar additive to initiate the separation of the micron-size clay particles. Also, it can be done by increasing the temperature.

When thoroughly dispersed, the cationic-modified clay will thicken the organic media considerably. However, the activity of the clay in preparing granular polymers is not to be construed to lie in the thickening properties but rather in its cationic character.

A wide range of organic liquids may be used to prepare granular polymers utilizing the dispersing characteristics of these cationic modified clays. In general, it has been found desirable that the polymer be separated from the liquid phase at some temperature such that the polymer has solidified from a dispersed liquified droplet to a dispersed granular stage. Agitation has been found essential during the transition from liquid to solid polymer. The temperature employed will be a function of the physical properties of the polymer being granulated. For crosslinked polymers which may be essentially infusible, high temperatures will be satisfactory and, if desired, the solidified polymer may be filtered or otherwise separated from the liquid media while hot. For low-melting solids it may be necessary to cool the mixture to quite a low temperature, even 0° C., in order to prevent fusion of the granular particles into a solid mass once agitation has ceased.

If the condition is met that the polymer solidifies while being agitated in the liquid medium containing the cationic modified clay, then the material can be obtained as a granular or powdered solid.

A wide variety of solvents has been found effective as dispersing media in preparing granular polymers. It is desirable that the solvent or dispersing medium be inert insofar as interaction with the monomers and/or polymers is concerned. Also, it should be essentially a non-solvent for the polymer. Thus, in the reaction of a diisocyanate with a polyol, aromatic solvents such as benzene, toluene, xylene, and the like are suitable. Hydrocarbons such as hexane, isooctane, kerosene, gasoline, crude petroleum oil, and the like are also satisfactory. Lower-boiling hydrocarbons, such as propane or butane, can be used and if necessary the reaction may be carried out under pressure in the presence of the cationic modified clay. This procedure may be very advantageous where it is desired to remove the dispersing medium afterward. Chlorinated hydrocarbons such as methyl chloride, methylene chloride, chloroform, carbon tetrachloride, trichloroethylene, tetrachloroethylene, brominated hydrocarbons such as bromoform, etc., fluorocarbons such as Freon 113 and Freon 11, etc., may also be used.

Polar solvents such as acetone, dioxane, ethyl acetate, dimethylformamide, acetonitrile, etc., are also representative solvent types satisfactory for the preparation of granular polymers where an onium cationic modified clay is present provided they do not appreciable dissolve the polymer.

It has been found that the polymers may be prepared in granular form or preformed solid thermoplastic polymers may be dispersed and granulated by this technique if an onium cationic-modified clay is present.

As will be illustrated by the following examples, it is possible to prepare granular forms of many polymers, such as thermoplastic polyurethane resins, crosslinked polyurethanes, and polyesters, and to cure epoxy resins to insoluble, infusible powders, and also to prepare and granulate solid epoxy resins without loss of oxirane oxygen content.

The process of this invention is illustrated by the following examples.

EXAMPLE 1.—PREPARATION OF A CROSSLINKED, WATER-SWELLABLE POWDER

The term "Varsol" is a trade name of the Humble Oil Company for a hydrocarbon solvent composed of a mixture of petroleum hydrocarbons boiling in the range of 160° C. to 200° C.

The term "Bentone 34" is a trade name of the Baroid Division of the National Lead Company for dimethyldioctadecylammonium bentonite.

To a thick gel prepared by blending 200 ml. of Varsol and 2 g. of Bentone 34 was added 100 g. (.011 mole) of E9000 (the commercial designation for a polyethylene glycol having an average molecular weight of 9000) followed by the addition and blending of 1 g. of triethylenediamine.

With the aid of about 75 ml. of hexane this blended mixture was transferred to a 2-liter, 3-necked vessel equipped with a stirrer, thermometer, separatory funnel, and a Dean-Stark water trap. On completion of the transfer the blended mixture was then heated with stirring to a temperature of 150° C. to effect the removal of water from the mixture as a hexane-water azeotrope. The hexane was used merely as a suspending medium for the product being prepared and as an azeotrope agent to remove water. Consequently no effort was made to remove any particular amount of hexane as a part of this process.

The presence of water is undesirable and consumes tolylene diisocyanate in the following step as well as interfering with the molecular weight buildup of the polymer being prepared.

After separating the water, the pot was cooled to 120° C. and 2 g. (.015 mole) of tolylene diisocyanate was added. After reacting for 45 minutes, another 2 g. (.015 mole) of diisocyanate was added dropwise and the reaction continued for an additional 60 minutes.

The reaction product was dispersed as well defined granules suspended in the hydrocarbon carrier and even at 120° C. showed no tendency to stick or clump together.

The grauular product was filtered, thoroughly washed with hexane and dried.

This product, being crosslinked with excess toluene diisocyanate, was found to be water-swellable but essentially insoluble in water. It was found that 4 g. of this granular material completely gelled 100 cc. of water.

EXAMPLE 2.—USE OF ISOOCTANE SOLVENT

In a Waring Blendor was blended 300 ml. of isooctane, 2 g. of triethylenediamine, 100 g. (.011 mole) of E9000 and 2 g. of Bentone 34. These components were blended to form a thick fluid which was transferred to a 3-necked vessel using isooctane to rinse and transfer the product completely.

Water was removed as a water-isooctane azeotrope, then at 100° C., 2 g. (.015 mole) of tolylene diisocyanate was added and allowed to react for 45 minutes whereupon an additional 1.5 g. (.086 mole) of diisocyanate was added and the reaction continued for an additional 45 minutes.

The granular product was filtered, washed with isooctane and dried. The product formed good beads which were crosslinked to the extent that in water they swelled and formed a fine dispersion of individually swollen granules without gelling the water.

EXAMPLE 3.—USE OF 50% SOLIDS RATHER THAN 33% OR 25% SOLIDS

As in Example 1, 200 g. (.0223 mole) of E9000, 5 g. of Bentone 34, 1 g. of triethylenediamine and 200 ml. of Varsol were blended and transferred to a reaction vessel with hexane. The water was removed by a hexane-water azeotrope at 140° C. After cooling the vessel to 120° C., 6.4 g. (.0368 mole) of tolylene diisocyanate was added dropwise. After reacting for 10 minutes an additional 0.2 g. of triethylenediamine was added and the reaction continued for 117 minutes.

The product was a fine granular powder.

The preceding examples have disclosed that E9000, with a melting point of 60° to 65° C., can be heated to 140° C. and not coalesce, provided a bentonite clay treated with an onium base is present. Otherwise, during the reaction with tolylene diisocyanate, the mixture would coagulate to a solid mass.

Investigation of the conditions required to prevent coagulation revealed that the concentration of cationic bentonite clay required is a linear function of the percent solids utilized in the reaction. While the exact slope of the curve will vary depending on the activity of the particular cationic clay used, a typical curve using the cationic clay described in Example 1 shows that a minimum of about 1% by weight of this clay, based on the polymer is required for dilute dispersions and that about 3% is required at 60% solids. Up to 5%, or even more, may be used, especially where very small particle size is desired in the granular product. This requirement varies in that the presence of acidic materials reduces the "protective colloid" nature of the cationic clay being used, and hence requires more clay.

The particle size of the granular product being prepared has also been found to be a function of the quantity of cationic clay employed. Increasing the quantity of cationic clay reduces the particle size of the product and micron-size dust has been prepared in this manner. At the other extreme, coarse gravel-size particles of ten mesh size have been prepared. By controlling the cationic clay concentration, granules of a size from about ten mesh to less than 325 mesh may be prepared.

EXAMPLE 4

A 3% slurry of Bentone 38 (a dimethyl-di(tallow oil alkyl)ammonium derivative of a magnesium montmorillonite (Hectorite clay) manufactured by the Baroid Division of the National Lead Corporation) was prepared in kerosene using a colloid mill to disperse and activate the cationic clay and to gel the kerosene.

In a 2-liter, 3-necked vessel equipped as in Example 1, 500 g. of the 3% cationic clay slurry was prepared, and to it was added 500 g. of E9000. After heating the resulting slurry to 85 to 90° C., 10 g. of 2,2'-isopropylidenebis(p-phenyleneoxy)diethanol was added. The mixture was heated to 110° C. to disperse this additive. After cooling to 65° C., 300 ml. of hexane was added. The water was removed as a water-hexane azeotrope with 250 ml. of hexane being removed in the process. The mixture was cooled to 80° C. and 16 g. tolylene diisocyanate was added dropwise followed by the addition of 3.75 g. of triethylenediamine (0.75%). Stirring was continued for 1½ hours at 85° C., after which the suspension was cooled to 60° C. and neutralized with 15% HCl solution. The product was a fine granular powder. This polymer swelled to >4 times its volume in water.

EXAMPLE 5

In order to show that merely thickening of the solvent is ineffective to make granular polymers, a mixture of 3% of silica flour known as "Cab-O-Sil," a product of Jeffrey L. Cabot, Inc., in kerosene was made, thus forming a thick gel slurry. On adding E9000 to the slurry at 85° C. it melted into an undispersed mass, precipitating the Cab-O-Sil and leaving a clear kerosene fluid phase.

EXAMPLE 6

Likewise, 3% of aluminum oleate in kerosene made a good gel but separated upon the addition of E9000 at 85° C.

EXAMPLE 7

In order to show that untreated clay is ineffective, a slurry of 6 g. of "Volclay," (trade name of the American Colloid Company for an untreated but refined bentonite clay) in 200 cc. of kerosene did not thicken or gel but settled out. Upon the addition of E9000 to the stirred mixture at 85° C., the E9000 melted and formed a sticky mass.

EXAMPLE 8

In order to show the amine alone is ineffective, 8 g. of Aromac-12, a trade name of Armour and Company for dodecyl tallow amine acetate, was added to 250 ml. of kerosene. Good dissolving and dispersion were noted. Upon the addition of 200 g. of E9000, the E9000 melted and dispersed; however, upon adding tolylene diisocyanate the product gelled and set up to a solid mass.

EXAMPLE 9

To show that the above amine on the above clay is effective, in a Waring Blendor was slurried 700 ml. of water, 30 g. of "Volclay" (described in Example 7). The clay expanded, swelled, and thickened the water considerably as a milky slurry. To this slurry was added 8.3 g. of Aromac-12 (described in Example 8) whereupon the slurry thickened drastically momentarily and the activated clay precipitated from the water accompanied by a reduction in volume. The thus treated clay was filtered, washed with water, and dried.

A gel was prepared by adding 8 g. of the thus treated clay to 200 g. of kerosene. After the addition of 200 g. of E9000, the contents were transferred to a 2-liter vessel with 100 ml. of hexane. After removal of the water via a water-hexane azeotrope, 6.8 g. of tolylene diisocyanate was added at 120° C. Then 0.2 g. of triethylenediamine was added and the reaction continued for 30 minutes. A good granular product resulted. This product swelled to 20 times its volume in water.

EXAMPLE 10

In a Waring Blendor was slurried 3 g. of Betone-34 in 200 ml. of Varsol. To this was added 100 g. (0.316 mole) of 2,2'-isopropylidenebis(p-phenyleneoxy)-diethanol. This was transferred to a 2-liter vessel with a hexane rinse and heated to 140° C. to remove water as a water-hexane azeotrope. After cooling to 100° C., 55 g. (0.316 mole) of tolylene diisocyanate was added over a 10-minute period. Ten minutes later 100 mg. of triethylene diamine catalyst was added which caused a mild exotherm. After 1 hour of reaction, the slurry was filtered, washed with hexane, and dried. The yellowish, granular solid product was molded to a brown film which was insoluble in water.

EXAMPLE 11

Same as in Example 10 with the following reactants: 90 g. (0.285 mole) of 2,2'-isopropylidenebis(p-phenyleneoxy)diethanol, 10 g. (0.005 mole) of P2000 (the commercial designation for a polypropylene glycol having an average molecular weight of 2000), and 50.4 g. of tolylene diisocyanate. The product was a creamy white powder which was molded to a firm, tough, milky white film which could be bent.

EXAMPLE 12.—PREPARATION OF POLYESTER RESIN IN GRANULAR FORM

In a Waring Blendor, was slurried 300 ml. of Varsol, 8 g. of Bentone-34 and 150 g. (0.48 mole) of 2,2'-isopropylidenebis(p - phenyleneoxy)diethanol followed by 70 g. (0.48 mole) of adipic acid and 2 g. of stannous octoate catalyst.

This blended mixture was transferred to a 3-necked, 2-liter vessel and water was azeotroped off by means of a Dean Stark trap at 147° C. Water came off as a result of the condensation of the polyol with the adipic acid. Ten ml. of water was recovered in 1.5 hours. An additional 2 ml. of water was recovered as the temperature reached 175° C. A portion of this water is believed to have come from the bentonite clay which normally holds about 2% water.

At 175° C., the light volatile components were distilled and removed in order to increase the reaction temperature. Volumes of fresh Varsol equivalent to that removed were periodically added to replace that light portion removed in order to maintain a constant volume. After six hours reaction at 175° C., the product slurry comprising translucent beads was cooled and filtered. The solid was slurried in hexane to remove Varsol, then filtered and dried.

The beaded product was soft in texture and was molded at 250° F. to a film which was somewhat rubbery in nature.

EXAMPLE 13.—PREPARATION OF A POWDERED EPOXY RESIN

In a colloid mill a 2% slurry of Bentone-38 in kerosene was made. 200 ml. of this slurry was placed in a 2-liter, 3-necked vessel and 800 ml. of kerosene was added.

The temperature was raised to 120° C. and, while agitating, 200 g. of flaked DER661 epoxy resin (the commercial designation for solid epoxy resin of the bisphenol A type having an epoxide equivalent weight of from 475 to 575) was added which immediately melted and dispersed. Then another 100 g. of DER661 was added to the vessel and the temperature increased to 140° C. This resin also melted and dispersed. A final portion of 100 g. of DER661 was added at 150° C. which dispersed in the kerosene-cationic clay mixture.

While maintaining agitation, the dispersion was cooled to 40° C. and filtered. The dispersion was so fine that filtration was difficult. The kerosene was then decanted from the funnel and the residue washed with hexane, with filtering and decanting in succession.

The residue was dried at 25° C. in a vacuum oven. The product was an extremely fine white powder. An analysis of the epoxide content revealed that essentially no loss occurred as a result of this treatment.

EXAMPLE 14.—POWDERED CURED EPOXY RESIN

Same as Example 13 except that a mixture containing 100 g. DER331 (a commercial designation for essentially the diglycidyl ether of bisphenol A having an epoxy equivalent weight of 180) and 10 g. of diethylene triamine was used instead of DER661. The product was a white, insoluble, infusible powder useful as a pigment or filler in high temperature (300–600° C.) resinous systems.

EXAMPLE 15.—USE OF MULTIFUNCTIONAL HYDROXYL ADDITIVES TO EFFECT CROSSLINKING OF A WATER-SWELLABLE POLYURETHANE

Same as Example 1 with the following components:

| | |
|---|---|
| Varsol ml | 250 |
| Bentone-34 g | 6 |
| Dry pentaerythritol g | 2 |
| E9000 g | 200 |
| Hexane ml | 100 |
| Tolylene diisocyanate g | 8 |

Prior to filtration the polymer was neutralized with 1 g. of anhydrous $H_3PO_4$ to improve the water stability of the polymer. This polymer swelled in water to 22 times its volume but retained its particulate form. It is useful as an oil well fluid additive to reduce fluid loss.

The process of the invention may be carried out at temperatures from about 30° C. to about 250° C. and preferably from about 80° C. to about 150° C. The temperature used, of course, depends upon the resinous product being prepared; however, at about 250° C. degradation of the cationic clay slowly occurs.

This system operates best in an alkaline medium; however organic acids which are essentially unionized may be used satisfactorily to prepare granular polymers. Strong mineral acids should be avoided since they tend to neutralize the amine on the cationic-modified clay, thereby destroying its activity.

EXAMPLE 16

Into a 1,000 ml. glass pot equipped with an anchor-type agitator and means for heating were placed 500 grams of 2-(2-methoxyethoxy)ethanol, 15 grams of Bentone–27 and 100 grams of ethylene-acrylic acid copolymer (5.8–5.9% acrylic acid, melt index of 19.1). The contents were heated to 150° C. with stirring. The heat source was removed and the contents cooled to 50° C., filtered, washed and dried. The powdered product was then screened with the following results:

| U.S. Standard Screen No.— | Percent |
|---|---|
| 30 | 4 |
| 40 | 4 |
| 50 | 6.5 |
| 100 | 13 |
| 140 | 6.5 |
| 270 | 17 |
| Pan | 49 |
| Total | 100.0 |

By the process of the invention substantially any solid polymeric material that can be melted at a temperature below about 250° C. can be dispersed in an inert nonsolvent for the material and thus recovered in granular form. Such materials include polystyrene, polyacrylic esters, styrene-maleic anhydride copolymers, polyvinyl ethers and esters, polyolefins, and the like. The aforementioned polymers, as well as others that are not fusible, can be made in dispersed form in non-solvent media by the techniques taught herein and thus recovered in granular form. For such purpose, the reactants are dissolved or dispersed in the liquid medium containing the onium-modified clay and the polymer is thus formed in granular form in the liquid medium.

We claim:
1. The process for producing solid polyolefin, polyvinyl ether, polyvinyl ester, copolymerized styrene-maleic anhydride, polystyrene, polyacrylic ester, copolymerized ethylene-acrylic acid, polyurethane, polyester or epoxy polymeric materials in granular form comprising agitating such materials in an organic liquid medium that is a non-solvent for such materials, said medium being at a temperature below about 250° C. and having dispersed therein an effective amount of about 0.5 to 5% by weight, based on the polymeric material, of an ammonium cation-modified organophilic clay wherein the ammonium cation contains at least one alkyl radical of at least 10 carbon atoms.

2. The process of claim 1 wherein the polymeric material is produced in situ by polymerization of the appropriate monomeric materials.

3. The process of claim 2 wherein the polymeric material is a polyurethane resin.

4. The process of claim 2 wherein the polymeric material is a polyester resin.

5. In a method for making a polyurethane resin by the reaction of an organic polyisocyanate with an organic polyol, the improvement of producing the resin in granular form by conducting the reaction in an inert organic liquid medium that is a non-solvent for said resin, said medium being effectively agitated and having dispersed therein an effective amount of about 0.5 to 5% by weight, based on the resin, of an ammonium cation-modified organophilic clay, said cation containing at least one alkyl radical of at least 10 carbon atoms.

6. The process of claim 5 wherein the clay is bentonite.

7. The process of claim 5 wherein the clay is montmorillonite.

8. The process of claim 5 wherein the liquid medium is a petroleum hydrocarbon.

9. The process of claim 5 wherein the ammonium cation is the dimethyldioctadecylammonium ion.

10. The process of claim 1 wherein the polymeric material is epoxy resin.

References Cited

UNITED STATES PATENTS

| 2,944,036 | 7/1960 | Floyd. | |
| 2,773,043 | 12/1956 | Zukas. | |
| 3,078,249 | 1/1963 | Russel | 260—40 |

FOREIGN PATENTS

| 594,653 | 11/1947 | Great Britain. |
| 589,819 | 11/1947 | Canada. |

MORRIS LIEBMAN, Primary Examiner.

H. H. FLETCHER, Assistant Examiner.

U.S. Cl. X.R.

260—31.2, 32.6, 32.8, 33.2, 33.8, 34.2, 37, 40, 41